United States Patent [19]

Shamie

[11] Patent Number: 4,632,421
[45] Date of Patent: Dec. 30, 1986

[54] FOLDING BABY CARRIAGE WITH DOUBLE LOCK

[76] Inventor: Louis Shamie, 972 Dean St., Brooklyn, N.Y. 11233

[21] Appl. No.: 831,148

[22] Filed: Feb. 19, 1986

[51] Int. Cl.⁴ ............................................. B62B 7/08
[52] U.S. Cl. .................................. 280/642; 280/650; 280/658; 280/47.36; 297/379
[58] Field of Search ............. 280/642, 644, 647, 650, 280/658, 47.36, 649; 403/96; 297/378, 379

[56] References Cited

U.S. PATENT DOCUMENTS

| | | | |
|---|---|---|---|
| 2,013,910 | 9/1935 | Burst | 280/642 |
| 3,421,774 | 1/1969 | Patterson | 280/642 |
| 4,506,907 | 3/1985 | Miyagi | 280/642 |
| 4,529,219 | 7/1985 | Shamie | 280/658 X |
| 4,591,176 | 5/1986 | Kassai | 280/47.36 |

Primary Examiner—John J. Love
Assistant Examiner—Michael Mar
Attorney, Agent, or Firm—McGlew & Tuttle

[57] ABSTRACT

A foldable carriage with double lock includes a plurality of members which are pivotally connected to each other and can be folded from an open to a closed position. One of the members includes one pivotally mounted latch which can engage a pin on another one of the members to hold the carriage in its open unfolded position. Another latch with a holding mechanism is engaged between other members to hold the carriage in its open position. To close the carriage, this latch is pivoted and held in an unlocked position by its holding mechanism so that the first latch can be moved to fold the carriage. A multi-purpose plastic bearing block is also used to connect various parts of the frame.

16 Claims, 6 Drawing Figures

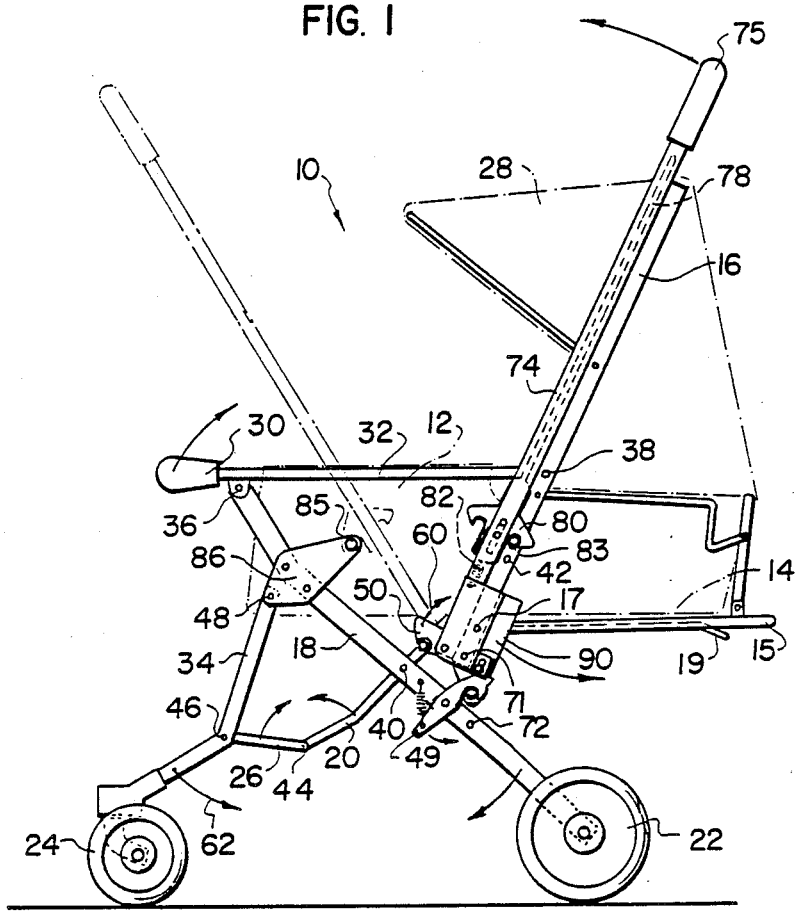
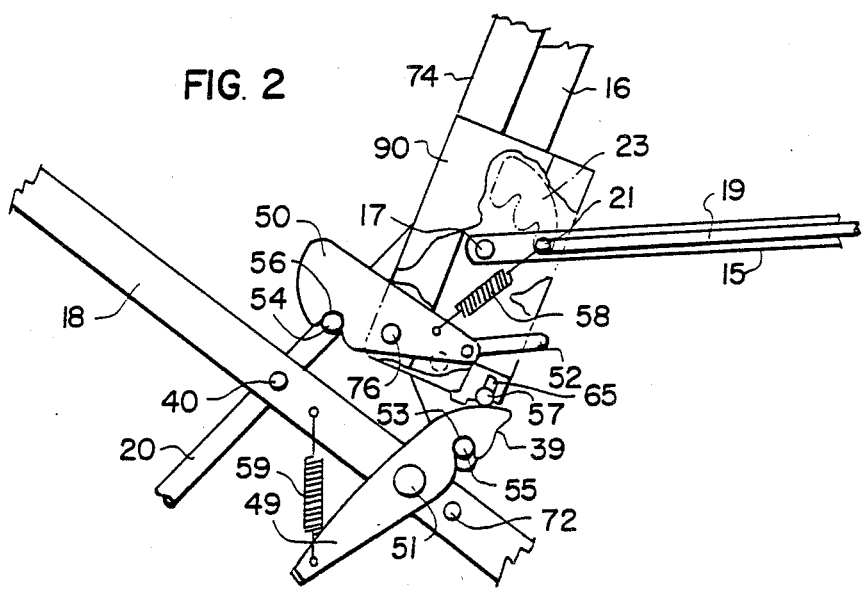

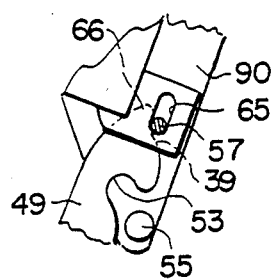
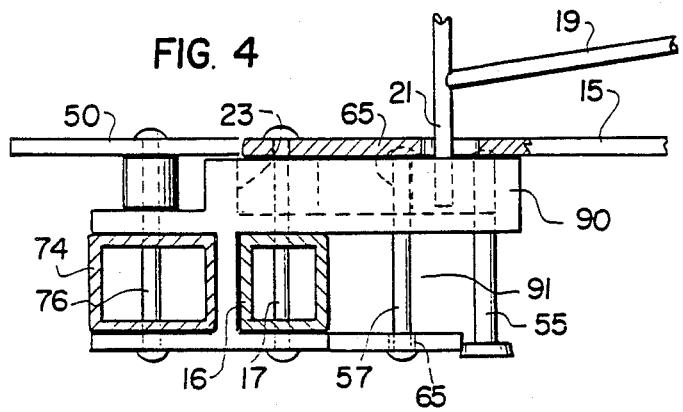
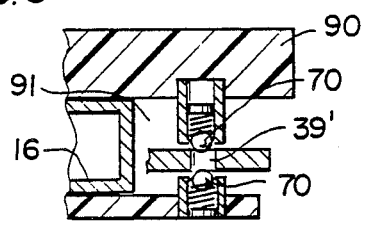
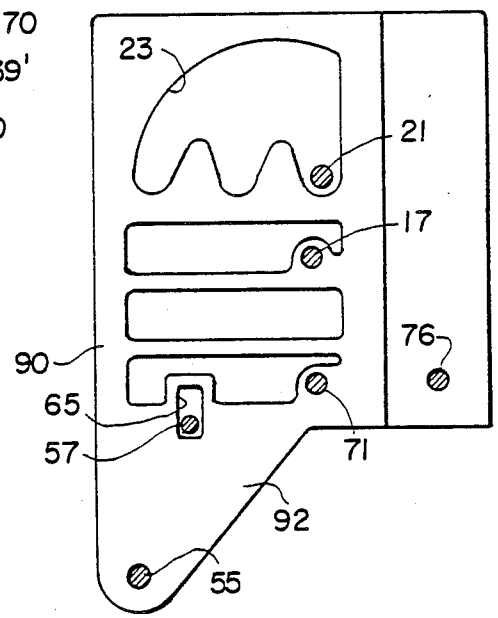

FOLDING BABY CARRIAGE WITH DOUBLE LOCK

FIELD AND BACKGROUND OF THE INVENTION

The present invention relates, in general, to baby carriages or strollers, and, in particular, to a new and useful carriage which includes a foldable frame and double lock for preventing inadvertent folding of the frame.

Strollers or baby carriages are known which have foldable frames of various configurations that are capable of being folded into a smaller size for easy carrying.

A latch of some sort is usually provided which holds the baby carriage in its open or unfolded condition. This latch can be activated or released to permit folding of the carriage frame. By design or after repeated use, it becomes increasingly easier to fold the baby carriage into its closed or folded configuration. An accidental movement of the latch may thus result in undesired folding of the carriage, when, for example, an infant is sitting in the carriage.

A foldable baby carriage with security locks is known from the inventor's previous U.S. Pat. No. 4,529,219 granted July 16th, 1985. This patent, which is incorporated here by reference, discloses a foldable baby carriage which utilizes a single locking latch which locks two members of the frame together to hold it in its unfolded condition. The locking latch must be pivoted for disconnecting the two members of the frame from each other and, thus, allowing the frame to fold. Before the latch can be pivoted, however, a purposeful unlocking of the latch must take place. This acts as an extra safety against inadvertent pivoting of the latch.

SUMMARY OF THE INVENTION

The present invention is drawn to a security lock arrangement for a baby carriage having a foldable frame, wherein two separate latches are utilized for disconnecting two relatively movable parts of the frame so that the frame can be folded.

According to the invention, the first of these latches includes means for holding the first latch in an unlocking position after it has been purposely moved so that the user of the stroller has an opportunity to move the second latch which permits the actual folding of the carriage.

Both latches are provided with biasing means for biasing the latches into their locking position. The holding means avoids the inconvenience of having to hold both latches in their unlocking position before the stroller can be folded. These holdings means, however, do not avoid the requirement for two separate and independent actions to unlock the frame and, thus, prevent an inadvertent folding of the frame.

Accordingly, an object of the present invention is to provide a carriage having a foldable frame which comprises a first frame member, a second frame member, a cross member pivotally connected to the first and second frame members, the first, second and cross members being moved between an open and a closed position. In the open position, the first and second frame members are spaced from each other. In the closed position, which requires movement of the cross member in a closing direction, the first and second frame members are positioned adjacent each other to reduce the overall volume of the carriage. A first latch is pivotally connected to the first or second frame member with a latch engagement pin connected to the other of the first and second frame members that is engaged with the first latch to hold the carriage in its open position. With movement of the first latch to disengage it from its engagement pin, holding means hold the first latch. A second latch can then be pivoted so that the frame may be folded into its closed position.

A further object of the invention is to provide a carriage and security lock combination which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a side elevational view of a carriage having a foldable frame which is provided with the inventive security lock arrangement;

FIG. 2 is a partial view, on an enlarged scale of the carriage shown in FIG. 1, in the latch and lock area, with parts of a plastic bearing block used in the carriage cut away;

FIG. 3 is a view showing part of FIG. 2 with the first latch in an unlocked and held position;

FIG. 4 is a top plan view of the bearing block and some of the frame and locking elements connected and engaged thereto;

FIG. 5 is a sectional view showing another embodiment for holding means that hold the first latch in its unlocked position: and FIG. 6 is an inside elevational view of the bearing block.

DESCRIPTION OF THE PREFERRED EMBODIMENT

Referring to the drawings, in particular, a carriage having a foldable frame of the type utilized in the invention is shown in FIG. 1. The carriage frame 10 which is foldable supports a seat shown in phantom line having a back 14 (in reclined position) supported by a back member 15 that is pivotally connected at 17 to a first frame member 16 and a seat with sides 12 supported by an arm member 32 of the carriage frame 10. A second frame member 18 on one side of frame 10 (other side also having one) is pivotally mounted to the arm member 32 at pivot point 36. Frame member 16 and arm member 32 are both U-shaped so that they have one leg on each side of the carriage frame. The lower end of each second frame member 18 rotatably receives an axle of a pair of rear wheels 22.

The two legs of first frame member 16 are pivotally connected to an opposite end of each leg of arm member 32 at pivot point 38.

A cross member 20, 26 is pivotally mounted at pivot points 40 and 42 between first and second members 16 and 18. The cross member is itself foldable at pivot point 44 and formed of a cross link 20 and a connecting link 26.

The carriage frame 10 has a front frame member 34 which is pivotally mounted at 48 to a second frame member 18 and pivotally mounted at 46 to link 26. The carriage frame includes two front frame members 34, one on each side of the frame, each of which pivotally and rotatably carries one or more front steering wheels 24.

The U-shaped first frame member 16 carries at its top a removable canopy 28 and the U-shaped arm member 32 carries at its front a padded crdoss rail 30.

As shown in FIGS. 1 and 2, a first latch 49 is pivotally mounted at 51 to second frame member 18. Latch 49 has a hook 53 that engages a pin 55 connected through a plastic bearing block 90 to the lower end of first frame member 16.

Also pivotally mounted to the lower end of first frame member 16 is a second latch 50 having an actuator bar 52 which extends across the width of carriage frame 10. Two latches 50 are provided, one for each leg of frame member 16, and bar 32 is connected to both of these latches.

Latch 50 includes a recess or hook 56 shown in greater detail in FIG. 2, which hooks latch engagement means in the form of pin 54 on cross link 20 to hold the frame in its open or unfolded position shown in FIG. 1. Latch 49 also independently hooks the frame in its unfolded position by engaging pin 55.

A spring 58 is connected between latch 50 and a rod 19 to hold hook 56 into engagement with pin 54. Rod 19 is slidably mounted on back member 15. Rod 19 has a pin 21 that engages one of three steps in a groove 28 in block 90, to set the inclination position of back 14.

Spring 59 connected between latch 49 and member 18 holds recess 53 on pin 55. To fold frame 10, latch 49 is first pivoted away from pin 55 into a locking position shown in FIG. 3. The latch is held in this unlocked position by holding means in the form of rivet 57 and recess 39 on latch 49.

When latch 50 is then rotated in the direction of arrow 60, the carriage frame can be moved into its closed or folded position. To accomplish folding, first frame member 16 is rotated counterclockwise with respect to pivot points 38 and 42. Second frame member 18 rotates counterclockwise with respect to the direction of arrow 62 and the cross and connecting links 20 and 26 rotate with respect to pivot point 44 toward each other. In the folded or closed position of carriage frame 10, members 16, 18 and 34 lie substantially parallel and adjacent each other to form a very compact configuration.

The holding means for first latch 59 comprises rivet 57 which is movable, substantially in a vertical direction, in a slot 65 provided in a tab-like projection of plastic bearing block 90. As shown in FIG. 4, slot 65 also extends through a remaining portion of block 90 and captures rivet 57. In this way, when latch 49 is rotated counterclockwise against the biasing of spring 59, top projection 66 that form recess 39 moves rivet 57 upwardly in its slot 65. Gravity then drops rivet 57 into recess 39 to hold latch 49 in its unlocked position with its recess 53 away from pin 55.

Instead of using a rigid rivet 57 in an elongated slot 65, FIG. 4 may also represent a resilient or elastic rivet 57 which is fixed in opening 65. Projection 66 can then deform rivet 57 upwardly and then engage in recess 39 to act as holding means for latch 49.

Another embodiment for the holding means is shown in FIG. 5, where-spring-loaded balls 70 mounted on opposite sides of a slot 91 formed by block 90, are biased into a hole 39' in the top of latch 49 70. When the second latch 50 is disengaged from its pins for permitting the folding of the carriage, the forceful swinging of the lower end of first frame member 16 away from the second frame member 18 causes disengagement of the ball 70 from latch 49 to permit folding of the carriage.

A further pin 72 may be provided on frame member 18 for limiting the rotation of latch 49 after it has disengaged from its holding means. This is to ensure that latch 49 is in a correct position when the carriage is unfolded to again engage pin 55. Any other stop mechanism can be used for ensuring the correct position for latch 49 so that it can receive pin 55.

Returning to FIG. 1 and 2, block 90 also pivotally carries a handle bar 74 which is pivotally mounted to block 90 at 76. As shown in FIG. 4, pivot 76 may be a pin which also pivotally carries latch 50. Handle bar 74 carries, at its upper end, a handle 75. Handle bar 74 also carries a locking rod 78 which is slidably mounted to handle bar 74. Locking rod 78 carries a double hook member 80 which is biased by spring 82 into engagement with a pin 83 fixed to first frame member 16. By lifting rod 78 against the bias of spring 82, handle bar 74 can be swung counterclockwise into its phantom line position shown in FIG. 1. In this position, double hook member 80 engages a pin 85 that is fixed to frame member 18. This converts the stroller configuration into a baby carriage configuration. It is noted that pivot 48 for front frame member 34 as well as pin 85 are carried on a plate 86 that is fixed, for example, by two rivets, to second frame member 18.

While the first frame member 16 is shown in FIG. 1 to have an upper end for holding up canopy 28, the invention can also operate with handle bar 74 removed and the handle attached to the top of first frame member 16. Such a stroller, of course, does not have the capacity to be transformed from a stroller configuration to a carriage configuration.

First frame member 16 is fixed to bearing block 90 by pivot pin 17 and a lower connecting pin 71, pivot pin 17 also acts as a pivot for back member 15.

As shown in FIG. 4 and 6, plastic bearing block 90 serves multiple purposes. As noted above, it is fixed to the first frame member 16 by spaced-apart pins 17, 71. Pin 17 also pivotally connects back member 15 to block 90.

Block 90 includes a slot 91 which is spanned by holding rivet 57 or other holding means, as shown for example in FIG. 5. Block 90 also carries engagement pin 55 for the first latch 49 and pin 76 which pivotally connects handle bar 74 to block 90 and pivotally connects second latch 50 to block 90.

Block 90 also carries multi-stepped groove 23 which engages pin 21 of rod 19 for setting the inclination position of back member 15. While back member 15 is shown in its fully reclined position in FIG. 1, it can be brought into a 45° position when pin 21 engages the middle step of groove 23, and in an upright position which is substantially parallel to first frame member 16 when pin 21 engages the left-most step of groove 23 (as shown in FIG. 6.)

Block 90 also includes a lower projection 92 which carries the engagement pin 55.

While specific embodiments of the invention have been shown and described in detail to illustrate the application of the principles of the invention, it will be understood that the invention may be embodied otherwise without departing from such principles.

What is claimed is:

1. A carriage having a foldable frame and lock combination, comprising:
   a first frame member;
   a second frame member;
   a cross member pivotally connected to said first and second frame members at pivotal connections therewith;
   said first, second and cross members being movable between an open position with said first and second members spaced from each other and with a portion of said cross member disposed adjacent a portion of said first member which is spaced from the pivotal connection between said first and cross members, and a closed position with said first and second members disposed adjacent each other and said portion of said first cross members spaced from each other, said cross member moving in a closing direction, with movement from said open to said closed position;
   a first latch pivotally connected to one of said first and second frame members;
   first engagement means connected to the other of said first and second frame members and engaged with said first latch to hold said first, second and cross members in said open position, and disengageable from said first engagement means in said closed position;
   holding means for holding said first latch in a position out of engagement with said first engagement means;
   a second latch pivotally connected to one of said first and cross members at said portions thereof;
   second engagement means connected to the other of said first and cross members adjacent said portion thereof, engaged with said second latch to hold said first, second and cross members in said open position, and disengaged from said second engagement means in said closed position;
   first biasing means connected to said first latch for biasing said first latch into a position of engagement with said engagement means; and
   second biasing means connected to said second latch for biasing said second latch into a position for engagement with said second engagement means;
   wherein, when said first, second and cross members are moved from said open position to said closed position, said first latch is pivoted against said first biasing means into engagement with said holding means for holding said first latch away from said first engagement means, and thereafter said second latch is pivoted against said second biasing means out of engagement with said second engagement means for permitting movement of said first, second and cross members into said closed position.

2. A carriage and lock combination according to claim 1, wherein said first latch is pivotally mounted to said second frame member, said first engagement means comprising a pin connected to a lower end of said first frame member, said holding means comprising a holding member movably mounted to said lower end of said frame member and a projection of said first latch defining a recess, said projection being pivotal under said holding member for moving said holding member, said holding member moving into said recess after said projection passes said holding member.

3. A carriage and lock combination according to claim 2, wherein said holding member comprises a rivet, said first frame member having a block at the lower end thereof with a vertically extending slot therein, said rivet being movable vertically in said slot.

4. A carriage and lock combination according to claim 3, wherein said second latch is pivotally connected to said first frame member, said engagement means being connected to said cross member.

5. A carriage and lock combination according to claim 4, wherein said second latch includes a recess, said second engagement means comprising a pin.

6. A carriage and lock combination according to claim 2, wherein said holding member comprises at least one spring-loaded ball movably mounted to the lower end of said first frame member and a recess in said first latch for engaging said ball to hold said first latch out of engagement with said pin.

7. A carriage and lock combination according to claim 1, including a plastic bearing block connected to a lower end of said first frame member at said portion of said first frame member, said second latch being pivotally mounted to said plastic block, said holding means comprising a holding member movably mounted to said plastic block and said first latch having a recess for engaging said holding member to hold said first latch away from said engagement means.

8. A carriage and lock combination according to claim 7, including a pivot pin extending through said block on which said second latch is pivotally mounted, a handle bar pivotally mounted to said block on said pivot pin, a hook member movably mounted to said handle bar, a first hook pin fixed to said first frame member for engagement by said hook member for holding said handle bar substantially parallel to said first frame member, a second hook pin fixed to said second frame member for engaging said hook member with said handle bar pivoted away from said first frame member.

9. A carriage and lock combination according to claim 8, including a back member pivotally mounted to said block, a further pivot pin extending through said back member and through said first member for pivotally connecting said back member to said block and for fixing said first frame member to said block, and a connecting pin extending through said block and through said first frame member for holding said first frame member to said block, said connecting pin being spaced away from said further pivot pin.

10. A carriage and lock combination according to claim 9, including a multi-stepped groove in said block above said further pivot pin and a rod pin movably mounted to said back member and engageable in one step of said multi-step groove for establishing a position of inclination for said back member with respect to said block.

11. A carriage and lock combination according to claim 10, wherein said block has a vertically extending slot therein, said holding member comprising a rivet vertically movable in said slot, said first latch including a projection defining said recess and being positioned to move said rivet upwardly and in said slot and to permit dropping of said rivet into said recess for holding said first latch away from said first engagement means.

12. A carriage and lock combination according to claim 1, including a front frame member pivotally connected to said second frame member, a connecting link pivotally connected between said cross member and said front frame member and an arm member pivotally connected between said first and second frame members above the pivotal connection of said first and second frame members to said cross member, said second latch pivotally mounted to a lower end of said first frame member and said second engagement means comprising a pin connected to said cross member.

13. A carriage and lock combination according to claim 12, including at least one rear wheel connected to a lower end of said second frame member, at least one front wheel connected to a lower end of said front frame member, said pivot point between said second member and said cross member being at an intermediate location on both of said second frame member and said cross member and said front frame member being pivotally connected to said second frame member at a location above said pivotal connection between said second frame member and said cross member.

14. A carriage having a foldable frame and lock combination, comprising:
   a first frame member;
   a second frame member;
   a cross member pivotally connected to said first and second frame members at pivotal connections therewith;
   said first, second and cross members movable between an open position with said first and second members spaced from each other and with a portion of said cross member disposed adjacent a lower end of said first member which is spaced from the pivotal connection between said first and cross members, and a closed position with said first and second members disposed adjacent each other and said lower end of said first frame member and said portion of said cross member spaced from each other, said cross member moving in a closing direction with movement from said open to said closed position;
   a latch pivotally connected to the lower end of said first frame members:
   engagement means connected to said cross member adjacent said portion thereof, engaged with said latch to hold said first, second and cross members in said open position, and disengaged from said engagement means in said closed position;
   a plastic bearing block fixed to the lower end of said first frame member, said block pivotally carrying said latch;
   a first pivot pin extending through said block and engaged with said latch for pivotally supporting said latch on said block;
   a handle bar pivotally connected to said block and on said pivot pin for pivoting from a first position parallel to said first frame member to a second position at a angle to said first frame member;
   a hook member movably mounted to said handle bar;
   a first hook pin connected to said first frame member for engaging said hook member to hold said handle bar parallel to said first frame member;
   a second hook pin connected to said second frame member for engaging said hook member to hold said handle bar at an angle to said first frame member;
   a back member pivotally mounted to said block;
   a second pivot pin extending through said block and engaged with said back member for pivotally connecting said back member to said block, said second pivot pin extending through said first frame member for holding said first frame member to said block;
   a further connecting pin connecting said block to said first frame member;
   said block defining a multi-step groove;
   a rod having a rod pin movably mounted to said back member with said pin engaged in one step of said multistep groove for holding said back member at a selected inclination position with respect to said block; and
   spring means connected between said latch and said rod for biasing said rod pin in one seat of said multi-seat groove and for biasing said latch into engagement with said engagement means.

15. A carriage and lock combination according to claim 14, including a further latch pivotally mounted to said second frame member, said block having a downwardly extending projection and defining a slot, a latch pin connected to said downwardly extending projection, said further latch having a recess for engaging said latch pin, spring means connected to said further latch for biasing said further latch into engagement with said latch pin, and holding means spanning said slot of said block and movable by engagement with said further latch, said further latch having a further recess for engaging said holding means to hold said further latch away from said latch pin whereby said first-mentioned latch can be pivoted out of engagement with said engagement means to permit movement of said first, second and cross members into said closed position.

16. A carriage and lock combination according to claim 15, wherein said holding means comprises a vertically extending slot in said block and a rivet movable vertically in said slot, said further latch having a projection defining said further recess and movable with rotation of said further latch to lift said rivet and permit said rivet to drop into said further recess.

* * * * *